Dec. 25, 1934.  L. C. WHITON, JR  1,985,705
FAN BLADE
Filed Jan. 30, 1932  3 Sheets-Sheet 1
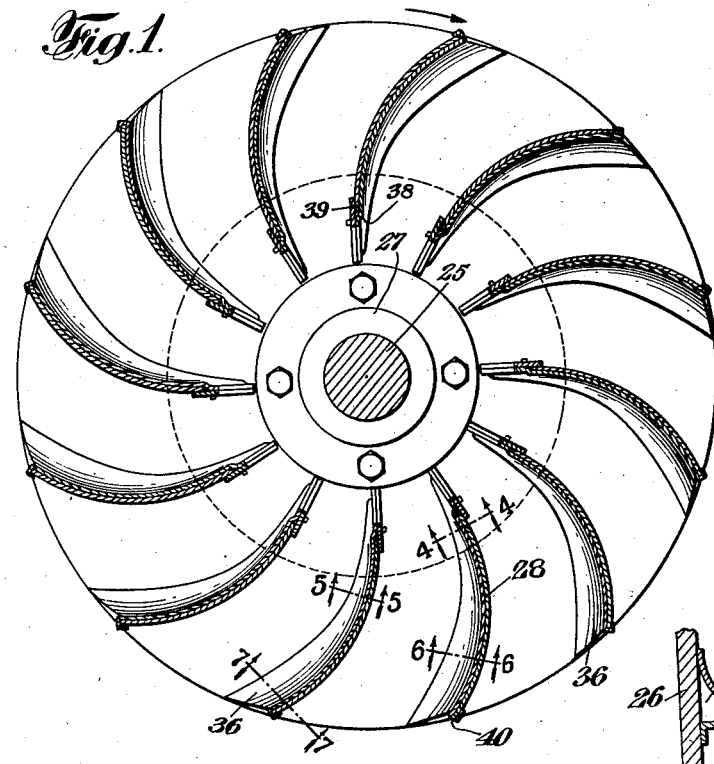
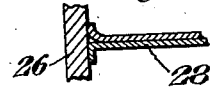
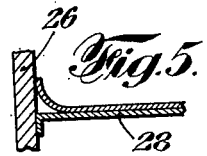
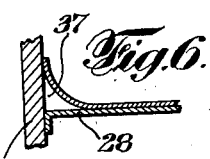
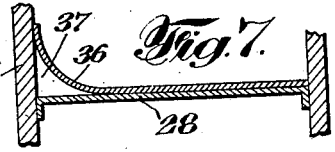
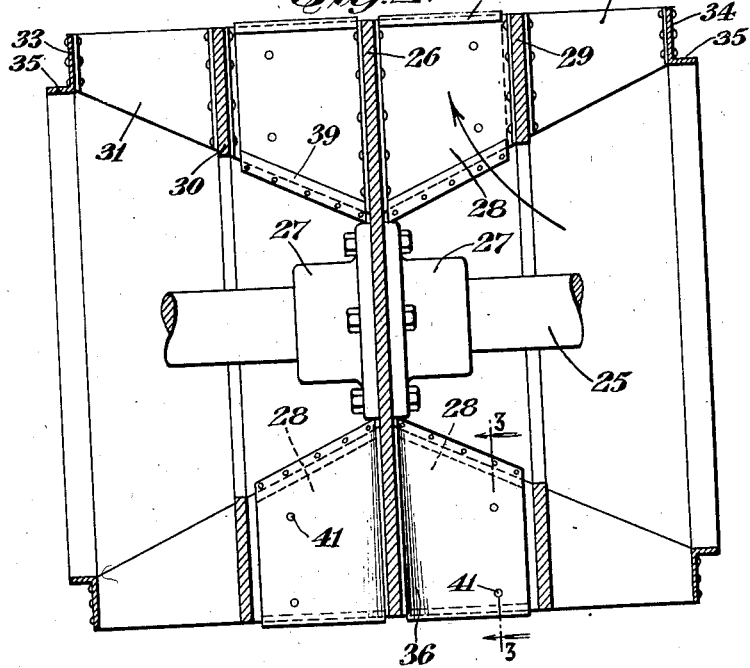
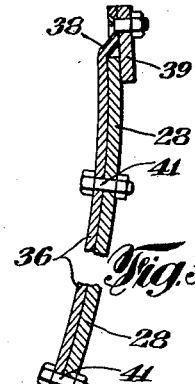
INVENTOR
Louis C. Whiton, Jr
BY
Usina & Rauber
ATTORNEYS

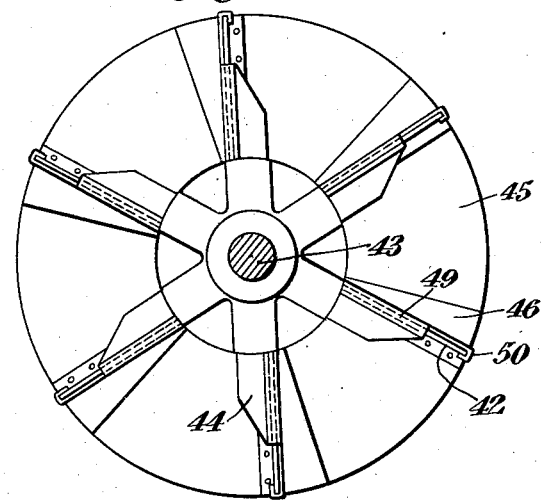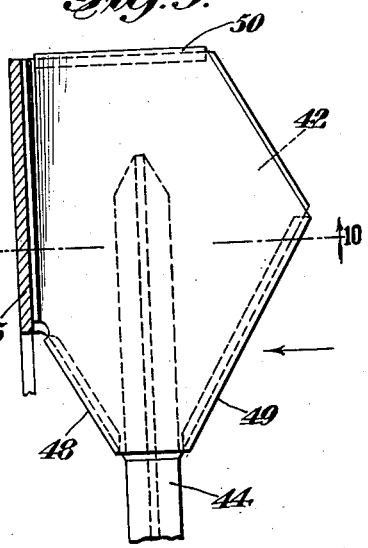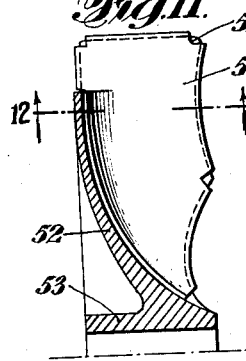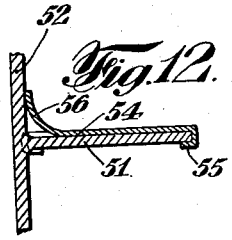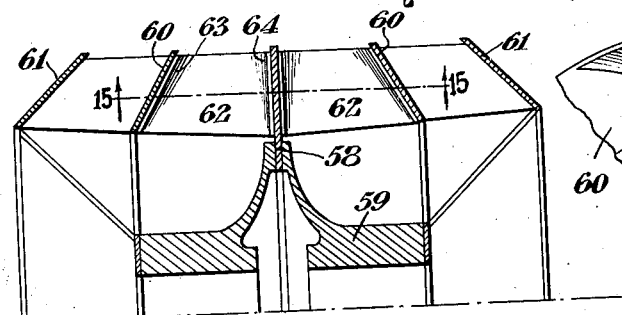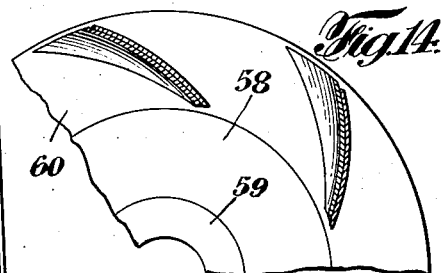

Dec. 25, 1934.  L. C. WHITON, JR  1,985,705
FAN BLADE
Filed Jan. 30, 1932    3 Sheets-Sheet 3
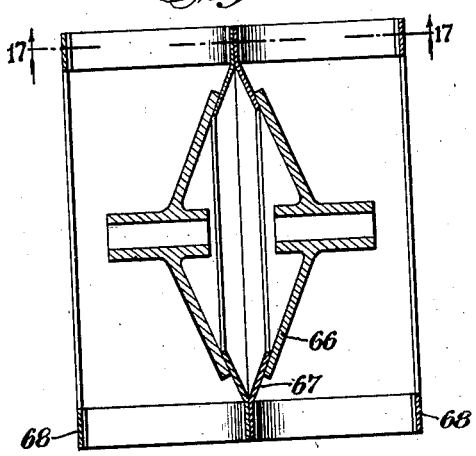
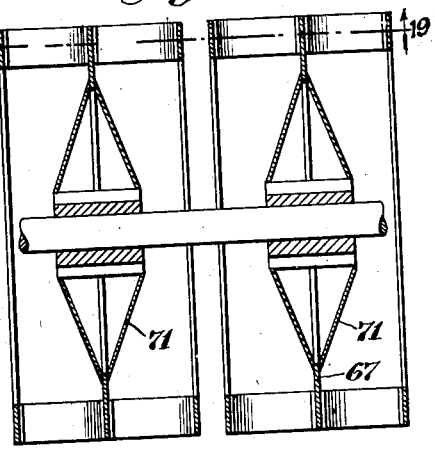
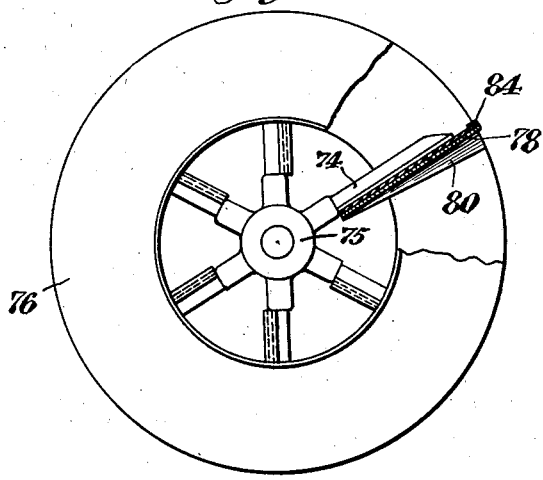
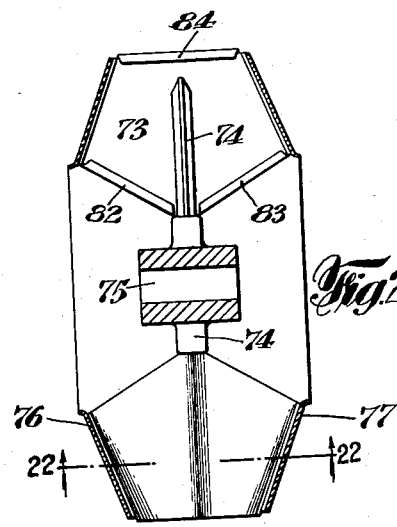
INVENTOR
Louis C. Whiton, Jr
BY
ATTORNEYS Patented Dec. 25, 1934

1,985,705

UNITED STATES PATENT OFFICE 1,985,705

FAN BLADE

Louis C. Whiton, Jr., New York, N. Y., assignor to Prat-Daniel Corporation, New York, N. Y., a corporation of New York Application January 30, 1932, Serial No. 589,791

14 Claims. (Cl. 230—133)

This invention relates to centrifugal blowers or draft apparatus and more particularly to blades for such apparatus to lessen or prevent erosion due to the presence of particles of material carried in suspension in the air or gases passing through the apparatus or fan blade.

The erosion effects of such particles are particularly destructive where the entering gas most sharply changes direction as it is propelled centrally outwardly, and where therefore there is a tendency for the particles to be thrown out of suspension and to pass over or in sliding contact with the surface of the fan blades and the central disc. This wearing action is particularly destructive when the particles are concentrated in a narrow zone or line of travel. When erosion is thus concentrated, parts of the blade are worn away most rapidly and result in eventually destroying the usefulness of the blower or of the rotor parts thereof.

An object of my invention is to provide a form of blade in which this concentration of particles is avoided, and in which the tendency for the particles to be thrown out of suspension against the surface of the blade and the central disc is greatly lessened.

Another object of the invention is to provide a relatively inexpensive wearing surface to receive the erosion effects, that may be easily and cheaply removed and replaced and thus to lessen or prevent the depreciation of the more expensive fan structure.

With this and other objects in view, which will more fully appear in the following description, the invention provides a wearing surface so positioned as to direct the air that enters axially of the rotor to a radially outwardly direction of movement with a reduced abruptness of change and with a broad deflecting surface that avoids the formation of a relatively narrow channel for the passage of the particles of suspended matter in contact with the propelling surface of the blade.

A further feature of the invention is the provision of a wearing plate or surface on the fan blade that is readily removable so that it may be replaced without changing or rebuilding the rotor or fan structure, and in most cases without the necessity for re-balancing the latter, and so that contact of suspended matter with the fan or blade is prevented.

The invention may be embodied in various forms and in various types of fans of which illustrative examples are shown in the accompanying drawings, in which Fig. 1 is a section of a fan embodying the invention taken transversely to its axis of rotation.

Fig. 2 is a longitudinal sectional view of the fan.

Fig. 3 is a section taken on line 3—3 of Fig. 2.

Figs. 4, 5, 6 and 7 are sectional views taken on lines 4—4, 5—5, 6—6 and 7—7 of Fig. 1.

Fig. 8 is a sectional view taken on a plane transverse to the axis of a fan, showing a different form of embodiment of the invention.

Fig. 9 is a radially sectional view of a portion of the fan blade of Fig. 8.

Fig. 10 is a view of the fan blade of Fig. 9 taken on line 10—10 on a plane transverse to the radius of the blade.

Fig. 11 is a radially sectional view of a fan in which the air enters from one side as in the fan of Figs. 8 and 9.

Fig. 12 is a sectional view taken on line 12—12 of Fig. 11.

Figs. 13, 14 and 15 are sectional views, respectively, on longitudinal planes, on planes transverse to the axis of the fan and on line 15—15 of Fig. 13 of a portion of a fan embodying a different form of the invention.

Figs. 16 and 17 are sections, respectively, longitudinal and on line 17—17 of Fig. 16 of a modified form of fan embodying the invention.

Figs. 18 and 19 are respectively sections taken on longitudinal planes and on line 19—19 of Fig. 18 of a fan embodying a still further form of the invention.

Figs. 20, 21 and 22 are respectively an end view, partly in section, a longitudinal section and a section on line 22—22 of Fig. 21 of a still further form of embodiment of the invention.

Referring more particularly to Figs. 1 to 7 inclusive, the invention is shown as applied to a fan having an axle 25 on which is mounted a central circular plate 26 by means of hubs 27 and on which in turn are mounted a number of fan blades 28.

The fan blades 28 may be of any suitable shape, for example of plain surfaces extending radially or of blades curved toward the direction of rotation indicated by the arrow in Fig. 1, as in the form shown in Figs. 1 to 7. The blades 28 may be secured to the supporting plate 26 by means of rivets or other suitable securing means. Similarly secured to the opposite free edges of the fan blades 28 are circular rings or annular plates 29 and 30, which serve in turn to support additional fan blades 31 and 32. To the opposite edges of the blades 31 and 32 are secured annular discs 33 and 34, respectively, having circular flanges 35 on their inner edges which form inlet openings for air or gases to be drawn into the fan or blower.

As the fan structure is rotated about the axle or shaft 25, it will be apparent that air enters longitudinally of the shaft 25 through the openings formed by the circular flanges 35, is then caught by the fan blade and thrown centrifugally outwardly. The direction of movement of the air from this longitudinal direction to the centrifugally outward direction is changed most sharply as the air is brought against and deflected by the central supporting plate 26 or the side plates 29 and 30. The sudden stoppage of this current of air from movement in this longitudinal direction tends to throw out, to some extent, suspended particles that may be carried therein. These particles are then caught by the fan blades 28 or 31 or 32 respectively, and carried on the surface of the rotor until they receive sufficient momentum to carry them outwardly to the outer edge of the fan, whereupon they are again taken up by the current of air.

This movement of the particles, whether solid, liquid or other consistency over the surface of the fan blade has a strong scouring effect which causes a rapid erosion of the blade at this part.

When a blade is thus eroded the entire fan must be re-built and re-balanced at a very considerable expense and cost.

In the present invention the tendency for suspended particles which are thrown from the current of air passing through the fan on to the fan blades, and concentrated in a narrow path thereon, is prevented or greatly lessened by providing a surface plate 36 on the forward surface of each of the fan blades and curving forwardly from the surface of the fan blade on a section such as shown in Figs. 4, 5, 6 and 7 transverse to the radius or radial direction of the blade between the surface of the blade and the supporting ring 26, or the rings 29 and 30 when a protective surface is applied to the blades 31 and 32. Consequently a current of air and suspended particles travelling longitudinally over the surface of the fan blade as indicated by the arrow in Fig. 2 is deflected more gradually to the outward direction, sharp angles are avoided between the fan blade 28 and the supporting plate 26 in which particles might concentrate and any particles that may be thrown out of suspension are distributed throughout the curved area of the protective surface. The curvature of the protective surface or surface plate 36 between the fan blade 28 and the supporting plate 26 is very slight at the radially inward or entering surface of the fan blade, as indicated in Fig. 4 taken on line 4—4, so that the air entering the fan structure will not pass into the space indicated at 37 in Figs. 6 and 7 between the curved part of the surface 36 and the fan blade 28.

The protecting surface or plate 36 is also sealed at its inner or gas-receiving end by being bent into the plane of the fan blade 28 as indicated at 38 in Fig. 3, and having an overlapping or hooked flange 39 secured thereto in such manner as to cover and enclose the inner edge of the fan blade 28. In this way all access of air or suspended particles to the fan blade 28 is substantially avoided.

The protective surface 36 may be permanently formed and secured on the fan blade 28 or as a part thereof. Preferably, however, it is made removable, so that when it is worn through by such erosion effect as may be left, it may be removed and replaced without in any way requiring a rebuilding of the entire fan. If the protective surfaces or protecting plates are weighed and replaced by blades of proper balanced weight, the protective surface plates may be replaced without the necessity of rebalancing the entire fan. In the form of the invention shown in Figs. 1 to 7 inclusive, the protective surface 36 is therefore secured to the fan blade 28 by the overlapping plate 39 at its gas-receiving edge, and hanging tightly on to the edge of the fan blade 28 secures the forward edge uniformly and tightly to the edge of the fan blade. The opposite or outward edge of the protective plate 36 may then be turned over or crimped over the corresponding edge of the fan blade as at 40 in Figs. 1, 2 and 3, and the protective surface may be still further secured by means of removable bolts 41, the purpose of which are to secure the protective surface immovable and tight against the central disk 26. When, therefore, the protective surface plates 36 may become worn by erosion, they may be easily removed by removing the bolts 41 and the flange 39 and sliding the surface outwardly of the fan blade 28, and be replaced by a similar plate of equal weight.

In the form of the invention shown in Figs. 8, 9 and 10 fan blades 42 are supported from a shaft 43 by means of spokes 44, to which the fan blades 42 are individually secured. To one of the side edges of the fan blade is secured, in any suitable manner, an annular plate or ring 45. The air or gas to be moved by the fan enters principally from one side, in the arrangement shown in Figs. 8, 9 and 10 from the right as indicated by the arrow, and then passes radially outwardly over the fan blade 42. The current of air is deflected very largely at the annular plate or ring 45. If unprotected, a quantity of suspended particles would separate from the air at this point and rapidly erode or scour away the surface of the fan blade and central disk. To prevent this erosion a protective surface or plate 46 is provided on the forward edge wearing surfaces of the fan blade and is curved between the surface of the fan blade 42 and the annular plate 45, as indicated in Fig. 10 in such manner as to eliminate sharp corners and to deflect the air and suspended particles as described above.

The protective surface 46 is also provided with an overlapping or hook edge 47, which engages the edges 48, 49 and 50 of the fan blade.

In the form of the invention shown in Fig. 11, the fan blades 51 are mounted on a cone-shaped deflecting ring 52, cast or mounted on a hub 53. A protective surface or plate 54 is provided on the wearing face of the fan blade with hook edges 55, and with a curved area 56 between the plate 52 and the face of the fan blades 51. In this manner the incoming current of air is gradually deflected, and the suspended particles spread in a broader path of travel.

In the embodiment of the invention shown in Figs. 13, 14 and 15 the fan blades 57 are curved forwardly towards the direction of rotation. They are supported symmetrically upon a central plate 58, having a supporting hoop 59 and between intermediate rings 60 and outer rings 61. The air enters from each side of the fan and passes over fan blades in a manner similar to that of the fan in Figs. 1 to 7. However, in this type of fan the air tends to be thrown not only against the central plate 58, but sidewise against the rings 60 and 61, owing to the conical shape of these parts, as shown in Fig. 13. For this purpose the fan blades 57 are provided on their forward faces with protective surfaces or plates 62 which have curved areas 63 and 64 on each side between the face of the fan blade and the rings 60 and 61 and the central plate 58. These surfaces may also be made removable or permanent, preferably removable, and have edges that hang over the inlet edges of the fan blades.

In the embodiment of the invention shown in Figs. 16 and 17 fan blades 65 are mounted symmetrically on a central cone 66, having annular outer securing plates 67. An outer ring 68 is provided on each end of the fan. The air enters from each side and is sharply deflected between the outer plates 67 and the fan blades. At this point, however, the fan blades are protected by a protective surface 69 having a curved area 70 between the blades 65 and the plate 67.

In the embodiment of the invention shown in Fig. 18 the arrangement is similar to that of Fig. 16, except that the structure is duplicated and that spiders 71 replace the cones 66, so that air may pass to the blades on each side of the central plate 67. Air enters from opposite sides of the two fan structures and is deflected from its longitudinal or axial direction of movement at the inner plate 67 of each of the fan structures and also at the opposite side rings 68 of the respective apparatus. This deflection may be caused to a large extent also by the meeting of the two currents of air entering from opposite directions. In this structure the suspended particles tend to be thrown against the plate 67 and ring 68. The protective surface 69 is therefore provided with curved areas 72 between the fan blade 65 and the plate 67 and ring 68 respectively as shown in Fig. 19.

In the embodiment of the invention shown in Figs. 20, 21 and 22 the fan blades 73 are supported on spokes 74 radiating from a central hoop 75. The side edges of the fan blades are secured to conical annular rings 76 and 77. Air enters from each side of the fan structure within the inner edges of the conical rings 76 and 77, is caught by the fan blades and thrown rapidly outward between the outer edges of the conical rings, the opposing currents tend to deflect each other from their axial direction of movement most strongly at the median point of the fan blades and also to be thrown against the inner surface of the conical rings 76 and 77.

To prevent concentration at these points, therefore, the protective surface 78 mounted either permanently or removably on the fan blades is provided with curved areas 79 and 80 between the fan blades 73 and the rings 76 and 77, and also with a pair of opposed curved areas 80 and 81 on each side of the median line, thus preventing concentration of particles thrown from suspension at these areas of the fan blade. As indicated the protective surfaces may be adapted to hook over the inner edges of the fan blade as at 82 and 83, and over the outermost edge at 84.

It will be understood that the above examples are given merely for the purposes of illustration, and that the invention may have still other forms of embodiment.

What I claim is:

1. A fan blade of the type described, having a propelling surface having straight line elements parallel to the axis of the plate over which a gaseous current may pass in an axial direction and be propelled centrifugally away from the axis of said blade, and a wearing surface plate on the propelling surface of the blade curving from the surface of said blade forwardly at a section transverse to the radial direction of said blade at the part of said blade where said axial movement of said gases terminates, the radius of said curvature being of substantial length and centered at a distance from said surface.

2. The fan blade of claim 1, in which said wearing surface is removable.

3. A fan of the type described which comprises a supporting plate, a fan blade joined at one edge to said supporting plate, the elements of said blade that extend parallel to the axis of rotation being straight and a deflecting plate having a surface curved upwardly from the propelling surface of the blade to the supporting surface of the plate, the radius of said curving of said surface being of substantial length and centered at a distance from said surface.

4. A fan blade of claim 3 in which said deflecting surface is removable.

5. The structure of claim 3 in which said deflecting surface is removable and extends to the inlet edge of said fan blade.

6. The structure of claim 3 in which the said deflecting surface extends about and underneath the entrance edge of said fan blade.

7. The structure of claim 3 in which the radius of curvature of said deflecting surface decreases toward the entrance edge of said fan blade.

8. A fan blade supported from a rotating axle, the elements in the propelling face of blade parallel to the axle being straight line elements and having an annular plate at one side edge and a deflecting surface plate on the propelling surface of the blade curved upwardly from the propelling face of said fan blade to the face of said annular plate, the radius of said curvature being of substantial length and centered at a distance from said surface.

9. A fan blade having a supporting annular plate at either side edge, the elements of said blade parallel to its axis of rotation being straight lined elements and a plate having a deflecting and wearing surface curving upwardly from the straight lined elements of the propelling surface of said blade to the face of said annular plate, the radius of said curving being of substantial length and centered at a distance from said surface.

10. The fan blade of claim 9 in which said annular plates are of conical curvature inclined toward the path of travel of gases over the face of said fan.

11. A fan blade mounted for rotation about an axis, the section of said blade on planes parallel to said axis being straight lined at the propelling face and a plate having a wearing and deflecting surface said wearing and deflecting surface curving upwardly from said propelling face to a plane transverse to the axis of rotation of said blade, the radius of said curving being of substantial length and centered at a distance from said surface.

12. A fan blade mounted for rotation about an axis and having a wearing and deflecting plate on the propelling surface of the blade having a surface projecting in a curvature convex to the propelling face of said fan to ridges extending transversely to the axis of rotation, and the said fan having annular plates intersecting said fan blades and concentric with the axis of rotation, said wearing surfaces being curved upwardly toward said concentric annular plates on a radius of curvature of substantial length and centered at a distance from said surface.

13. The apparatus of claim 12 in which said wearing surfaces are replaceable and are balanced symmetrically about the axis of rotation.

14. A fan element comprising an impeller blade, the elements in the impelling surface of said blade parallel to the axis of rotation of the blade being straight line elements, a supporting and deflecting plate in a plane intersecting that of said impeller surface and a wearing surface plate on the propelling surface of the blade curving tangentially between said plate and said blade on an increasing radius of curvature at increasing distances from the axis of said blade.

LOUIS C. WHITON, Jr.